United States Patent [19]

Forster

[11] Patent Number: 5,738,000
[45] Date of Patent: Apr. 14, 1998

[54] AXIAL PISTON MACHINE WITH GUIDES FOR THE PISTONS CONTAINED THEREIN

[75] Inventor: Franz Forster, Karlstadt-Mühlbach, Germany

[73] Assignee: Linde Aktiengesellschaft, Germany

[21] Appl. No.: 681,269

[22] Filed: Jul. 22, 1996

[30] Foreign Application Priority Data

Jul. 28, 1995 [DE] Germany ............ 195 27 647.7

[51] Int. Cl.[6] ........................................ F16J 15/18
[52] U.S. Cl. .................. 92/165 R; 92/71; 92/57; 92/12.2; 91/499; 417/269; 74/60; 184/6.17
[58] Field of Search ................ 92/12.2, 57, 71, 92/165 R; 91/499; 417/269; 74/60; 184/6.17

[56] References Cited

U.S. PATENT DOCUMENTS

| | | | |
|---|---|---|---|
| 1,714,145 | 5/1929 | Sperry | 184/6.17 |
| 2,827,792 | 3/1958 | Hopkins | 92/71 |
| 3,006,324 | 10/1961 | Shaw | 417/269 |
| 3,663,226 | 5/1972 | Biermann | 92/57 |
| 3,938,397 | 2/1976 | Rasmussen | 74/60 |
| 3,939,717 | 2/1976 | Teisen | 74/60 |
| 4,090,430 | 5/1978 | Matsumoto et al. | 417/269 |
| 4,425,837 | 1/1984 | Livesay | 92/71 |
| 4,776,257 | 10/1988 | Hansen | 92/12.2 |
| 5,316,446 | 5/1994 | Kimura et al. | 417/269 |
| 5,382,139 | 1/1995 | Kawaguchi et al. | 417/269 |
| 5,417,552 | 5/1995 | Kayukawa et al. | 417/269 |
| 5,490,767 | 2/1996 | Kawou et al. | 417/269 |
| 5,529,461 | 6/1996 | Kawaguchi et al. | 417/269 |
| 5,533,871 | 7/1996 | Takenaka et al. | 417/269 |
| 5,573,379 | 11/1996 | Kimura et al. | 417/269 |

FOREIGN PATENT DOCUMENTS

415432  6/1925  Germany .

*Primary Examiner*—Thomas E. Denion
*Attorney, Agent, or Firm*—Webb Ziesenheim Bruening Logsdon Orkin & Hanson, P.C.

[57] ABSTRACT

An axial piston machine includes a housing and a rotary shaft is mounted in the housing. A plurality of radially spaced cylindrical bores are arranged concentrically around the shaft and a reciprocal piston is located in each bore. A plate is located at an angle of inclination with respect to the rotary shaft. Each piston is connected to the plate by a support body locator and first and second support bodies are located in the support body locator and are in contact with the opposed surfaces of the plate.

32 Claims, 8 Drawing Sheets

AXIAL PISTON MACHINE WITH GUIDES FOR THE PISTONS CONTAINED THEREIN

BACKGROUND OF THE INVENTION

1. Field of the Invention

This invention relates generally to an axial piston machine having a plurality of radially spaced cylindrical bores concentric with the axis of rotation of the machine having pistons therein. The pistons are guided for reciprocal movement in the cylindrical bores, and the periphery of a plate located at an angle to the axis of rotation is connected to the free ends of the pistons.

2. Description of Related Prior Art

Prior art axial piston machines have a construction wherein a rotating cylindrical drum contains cylindrical bores and is connected to the machine shaft and the swash plate is fixed to the housing and does not rotate. The angle of inclination of the swash plate with respect to a plane which is perpendicular to the axis of rotation of the axial piston machine is not adjustable. A machine having this design is called an axial piston machine employing the swash plate principle.

The prior art also discloses axial piston machines in which the cylindrical drum is stationary and the swash plate is connected to the machine shaft for rotation therewith. In such machines, the swash plate is designated a wobble plate, and the machine is called an axial piston machine employing the wobble plate principle. The angle of inclination of the wobble plate relative to a plane perpendicular to the axis of rotation of the axial piston machine can be adjustable. However, such a capability is significantly more expensive than an axial piston machine having a stationary swash plate with a fixed angle of inclination.

Axial piston machines having either the swash plate design or the wobble plate design can be used as both pumps and motors. It is also possible to fix the shaft in position and rotate the housing around the shaft.

The power of an axial piston machine is defined as the product of the geometric volume flow and the operating pressure. The geometric volume flow is the product of the displacement volume per revolution and the speed of rotation and is a function of the angle of inclination of the swash plate or the wobble plate.

Support bodies are generally provided to operatively connect the pistons to the plate. The prior art support bodies are in the form of sliding blocks and each piston is connected to the sliding block by a ball-and-socket joint. In a preferred embodiment, the ball is molded onto the sliding block and extends into the socket which is formed on the end of the piston and the outer edge of the socket is crimped around the ball to hold it in place.

If the angle of inclination of the wobble plate is increased to increase the power of the axial piston machine, the angle of rotation in the ball-and-socket joints of the sliding blocks is also increased. Unless the extent to which the ball is surrounded by the piston-side socket is reduced, the diameter of the web which connects the ball of the ball-and-socket joint to the sliding block must be reduced. Since the transverse forces acting on the piston and thus also on the ball-and-socket joint increase when the angle of inclination of the wobble plate is increased, the tipping moment exerted on the ball-and-socket joint also increases as a result of the greater lateral offset between the center of the ball-and-socket joint and the contact point of the sliding block on the wobble plate, and the limits of the load bearing capabilities of the materials forming the ball-and-socket joint are rapidly reached.

In axial piston machines of the prior art which employ the swash plate principle, consideration must be given to centrifugal forces which are exerted on the cylindrical drum and which generate tipping moments. These forces limit the speed of rotation of the machine because the cylindrical drum can tip away from the control surface on the housing above a defined speed of rotation. This effect is increased when sliding blocks are used for the axial support for the piston because the sliding blocks are relatively heavy components. It is, therefore, impossible to increase the power of such a machine by increasing the speed of rotation during operation. If an attempt is made to increase the power of the machine by increasing the angle of inclination of the swash plate, ignoring the problem described above regarding the strength of the components of the ball-and-socket joint, the longer and, therefore, heavier piston will create greater centrifugal forces applied to a longer lever arm. The accompanying increase in the above-mentioned lateral offset between the center of the ball-and-socket joint and the contact point of the sliding block further increases the centrifugal forces which lowers the speed at which tipping can occur. Such a machine will also have reduced strength at high speeds of rotation, which means that the increase in power which is obtained by increasing the angle of inclination is substantially negated.

The support of the piston by a sliding block connected to the piston by a ball-and-socket joint also affects the start-up behavior of an axial piston machine. Because of the lateral offset between the center of the ball-and-socket joint and the contact point of the sliding block, a moment is generated during start-up which counteracts the rotary motion. The moment increases as the distance between the contact point of the sliding block on the drive disc and the center of the ball-and-socket joint increases. This tends to counteract an increase in the angle of inclination of the wobble plate.

The type of support of the pistons on the wobble plate by ball-and-socket joints and sliding blocks described above, in combination with other factors, also determines the overall length of the axial piston machine.

In prior art axial piston machines, the maximum angle of inclination of the wobble plate relative to the axis of rotation, taking the above-mentioned conditions into consideration, is between 18° and 20°.

SUMMARY OF THE INVENTION

It is known in the art that a machine of this type wherein the plate is fixed to the housing and, hence, does not rotate is a swash plate type machine. Alternatively, a machine of this type wherein the plate is fixed to the rotating shaft is a wobble plate type. The object of the present invention is to provide an axial piston machine having a simple construction, a relatively short overall length and increased power. This is accomplished by mounting first and second support bodies in a support body locator positioned on the end of the piston closer to the plate to contact both faces of the plate. The two support bodies are in the form of segments of a sphere and have coaxial mean perpendiculars. As a result of the invention, the angle of inclination of a wobble plate relative to the axis of rotation can be significantly increased and consequently the geometric volume flow and, thus, the power of the axial piston machine increases super-proportionally.

The invention provides an axial piston machine having an increased angle of inclination of the plate and, thus, increased power. The increased angle of inclination, however, results in increased transverse piston forces, which requires additional support. The lever arm to which the transverse forces on the piston are applied is also longer, because the larger angle of inclination of the plate requires longer pistons. Consequently, to support the transverse forces, the portion of the piston which is located within the cylindrical bore which applies a counter-moment is lengthened to increase the length of the dead stroke.

The support bodies for the plate are lightweight spherical segments which, in an axial piston machine having a swash plate design, result in relatively low centrifugal tipping forces on the cylindrical drum. An additional advantage is improved start-up of the machine.

An axial piston machine according to the invention has a shorter overall length than prior art machines because the contact of the plate by support bodies in the form of segments of a sphere requires very little space in the axial direction compared to the support provided by a ball-and-socket joint and a sliding block. Finally, the system of the invention acts as a piston pull-back device, which ensures that the pistons always remain in effective contact with the plate, i.e., even during the decompression stroke. The prior art machines, some of which increase the size of the axial piston machine in the axial direction, are comparatively complex and expensive to manufacture and to assemble.

If the centers of the spheres which correspond to the spherical segments are located on the center axis of the piston and on the center plane of the plate, favorable conditions are created with regard to the dissipation of the piston force. Because the support bodies are identical spherical segments of a common surrounding sphere, the parts inventory is minimized.

In one embodiment of the invention, the face of at least one support body is hydrostatically supported on the support body locator and on the plate. This guarantees smooth operation of the axial piston machine of the invention.

A force component is created during operation of the machine which tends to undesirably rotate the pistons around their respective center axes because of geometric considerations. The invention, therefore, provides for securing the pistons to prevent such rotation. In one embodiment of the invention, such rotation is prevented by providing the support body locator with peripheral guide surfaces which contact corresponding peripheral guide surfaces on the support body locators of the adjacent pistons. Additionally, at least one of the support body locators is mounted to prevent its rotation around the center axis of the corresponding piston relative to the housing. Each support body locator is supported on an adjacent piston and torque is ultimately introduced into the machine housing by the support body locator which is mounted to prevent its rotation relative to the housing. In the arrangement wherein the guide surfaces of the support body locators are effective in the peripheral direction, as seen in a cross section perpendicular to the axis of rotation of the machine, they are the radial edges of a sector of a circle.

An additional advantage of the invention is that the shaft is supported in the axial direction by a hydrostatic bearing in the housing. As a result of this arrangement, large forces are absorbed by the housing and only two additional radial bearings are required to absorb the remaining radial bearing forces.

The support of the pistons on the plate in the invention results in an axial piston machine having, on one hand, an extraordinarily large angle of inclination and, on the other hand, smaller dimensions because of the support of the transverse force. Consequently, the axial piston machine has a high power density.

In another embodiment of the invention, each support body locator is provided with a guide device which is effective over the entire length of the piston stroke. The guide device absorbs the transverse forces exerted on the piston by the plate, so that the transverse forces are supported directly at the point of origin on account of the inclination of the plate. It is thereby possible to maintain the guide length of the pistons in the cylindrical bores unchanged, while shortening the guide length compared to the dimension in similar prior art machines, which is generally equal to approximately 1.5–2.5 times the diameter of the piston, to the size required to seal the cylindrical bores. Consequently, the dead stroke of the pistons is decreased and the axial length of the entire machine is decreased. The weight of the piston is also reduced which results in increased speed of rotation in an axial piston machine of the invention.

It is advantageous to support the pistons against the transverse forces caused by the plate by a guide device which, when viewed in a plane which is perpendicular to the axis of rotation, has a guide slide connected to or formed on the support body locator. The guide slide is longitudinally guided by a guide member on the machine housing. The support of the transverse forces generated by the plate is optimized if the guide slide is a guide piston and the guide member is a piston bore, whereby the center axis of the piston is parallel to the center axis of the guide piston. In one arrangement, the piston bore, when viewed in cross section, overlaps the guide piston to a point beyond its centerline.

As explained above, the axial piston machine of the invention can have the swash plate construction wherein a cylindrical drum containing the cylindrical bores is connected to the machine shaft, or a wobble plate construction wherein the cylindrical bores are connected to or formed in the housing and the wobble plate is mounted for rotation with the machine shaft. It is particularly advantageous if the axial piston machine of the invention uses the wobble plate construction because the pistons and the cylindrical drum do not rotate. Therefore, there are no centrifugal forces which create a speed of rotation at which tipping can occur as in an axial piston machine having a swash plate construction.

Moreover, the swash losses of the rotating parts are reduced in an axial piston machine having a wobble plate construction, since only the wobble plate rotates in the pressure medium. A decrease in the thickness of the wobble plate in the invention is made possible by connecting the pistons to the wobble plate by spherical segments. This arrangement results in a blade-like extension of the wobble plate into the leaked oil which accumulates in the machine housing, i.e., with the lowest possible swash losses.

Overall, the losses in the wobble plate machine of the invention are lower than the axial piston machines of the prior art and lower than the radial piston machines of the prior art which have a rotating cylindrical block, in spite of an increase of both the angle of inclination of the wobble plate and, thus, of the piston stroke and of the speed of rotation. The efficiency of such a machine is therefore improved.

In another embodiment of the invention, a second piston may be located on the side of the support body locator opposite the first piston, and the second piston is guided in a bore formed in the housing. In this arrangement, the centrifugal forces which act on the pistons, the sliding blocks and the cylinder block in axial piston machines which utilize the swash plate principle are eliminated, and the arrangement is favorable with regard to the absorption of transverse forces. In terms of manufacturing technology, it is advantageous if the second piston is coaxial with the first piston. The "coaxial" relationship of the pistons represents an alternative to the "parallel" arrangement of a guide slide connected to the support body locator mentioned above.

The axial piston machines of the prior art which employ the wobble plate construction include arrangements in which a control pin controls the admission and discharge of hydraulic fluid to the cylindrical bores. A control surface is located on the periphery of the control pin or on a surface which is fastened to the housing and surrounds the control pin. In such an arrangement, it is difficult from a manufacturing point of view to maintain the correct amount of clearance between the control pin and the matching surfaces which interact with it. Moreover, after long operation, this clearance increases because of wear, which results in increased leakage losses and reduced machine power.

To maintain the power of an axial piston machine of the invention having a wobble plate construction as high and as uniform as possible, a favorable design includes an orifice surface located on the machine housing and oriented perpendicular to the axis of rotation of the machine shaft. Supply channels connected to the cylindrical bores and a first connecting channel and a second connecting channel radially spaced from it open on the orifice surface. A rotating control body which controls the periodic connection of the supply channels to the connecting channels is axially located between the orifice surface and the end of the machine shaft. The result is an axial control surface which is relatively easy to manufacture and does not exhibit any significant increase in leakage caused by wear even after relatively long operating times of the machine.

The control surface can be cast directly on the orifice surface which is connected to the housing, but it is advantageous if the control surface has kidney-shaped control nodules located opposite to the orifice surface which is located on the control body. The kidney-shaped control nodules interact with the supply channels and are each connected to a connecting channel located in the control body. The connecting channels open at a point on the control surface which is opposite the first connecting channel or the second connecting channel, respectively.

It is advantageous if the control body has hydrostatic relief grooves which are directed toward the orifice surface, and the end surface adjacent to the machine shaft is provided with at least one bore connected to at least one connecting channel located in the control body. A longitudinally-movable compensation piston is located in the bore and the end surface of the piston projects out of the control body past the end of the control body to contact the end of the machine shaft. The result is a linear orientation of the control body. The compensation piston is appropriately pushed toward the axial end of the machine shaft by a spring. On one hand, as a result of the spring force, the control body is in contact with the orifice surface on the housing, even when the axial piston machine is shut down, and, on the other hand, the opposite end of the machine shaft is axially pressed against the axial bearing.

It is advantageous if there are at least two compensation pistons in the control body, one of which corresponds to the high pressure side of the control surface and one of which corresponds to the low pressure side of the control surface. The bores of the compensation pistons are connected, respectively, to one of the connecting channels. Preferably, there are three compensation pistons in the control body, as a result of which the control body is statically supported against the axial end of the machine shaft to a defined extent.

In a space-saving construction the control body is located axially within the radial space in the axial extension of the housing wherein the cylindrical bores are located.

In an additional embodiment of the invention, a shuttle valve having two inputs and an outlet is located in the control body. One valve input is connected to each of the connecting channels and the valve output is connected to the hydrostatic bearing of the machine shaft. The hydrostatic bearing is therefore constantly pressurized with a pressure medium from the high pressure side of the axial piston machine by the action of the shuttle valve located in the control body during operation. The pressure medium channel for the hydrostatic bearing which communicates with the shuttle valve outlet is located in the machine shaft. A bushing is located between the shuttle valve outlet and the pressure medium channel. One end of the bushing is located in the axial bore of the machine shaft and the other end of the bushing is located in an aligned axial bore in the control body. In this arrangement, the hydrostatic bearing is supplied with a pressure medium without separate pressure medium lines located outside of the machine housing.

A technically simple coupling of the machine shaft to the control body is achieved if the machine shaft and the facing surface of the axial end of the control body are provided with interacting connecting elements such as notches and clips.

A complete understanding of the invention will be obtained from the following description when taken in connection with the accompanying drawing figures wherein like reference characters identify like parts throughout.

BRIEF DESCRIPTION OF THE DRAWINGS

FIG. 9 is a partial section perpendicular to the axis of the axial piston machine shown in FIG. 8.

DESCRIPTION OF THE PREFERRED EMBODIMENTS

The axial piston machine shown in FIGS. 1–5 of the drawings shows an axial piston machine having a wobble plate construction. The machine has a housing 1 having a plurality of radially spaced cylindrical bores 2 therein located concentric to the longitudinal axis D of the rotary shaft 3. The shaft 3 is supported for rotation in the housing 1 by a hydrostatic bearing 3a which absorbs the axial forces, a roller bearing 3b and a friction bearing 3c which absorb the radial forces in the housing. A conical roller bearing may be provided to absorb the axial forces instead of the hydrostatic bearing 3a, in which case, the roller bearing 3b can be omitted.

A reciprocal piston 4 is located in each of the cylindrical bores 2 for longitudinal movement. The end of the piston 4 which projects out of the cylindrical bore 2 is connected to a wobble plate 5 which is connected to the rotary shaft 3. The wobble plate 5 is located at a defined angle with a plane perpendicular to the axis D of the shaft 3 which in the following description is called the "angle of inclination" of the wobble plate. In the embodiment of the invention illustrated in FIGS. 1 to 5 of the drawings, the angle of inclination is constant. However, the wobble plate may be adjusted to vary the angle of inclination.

Figure 1:
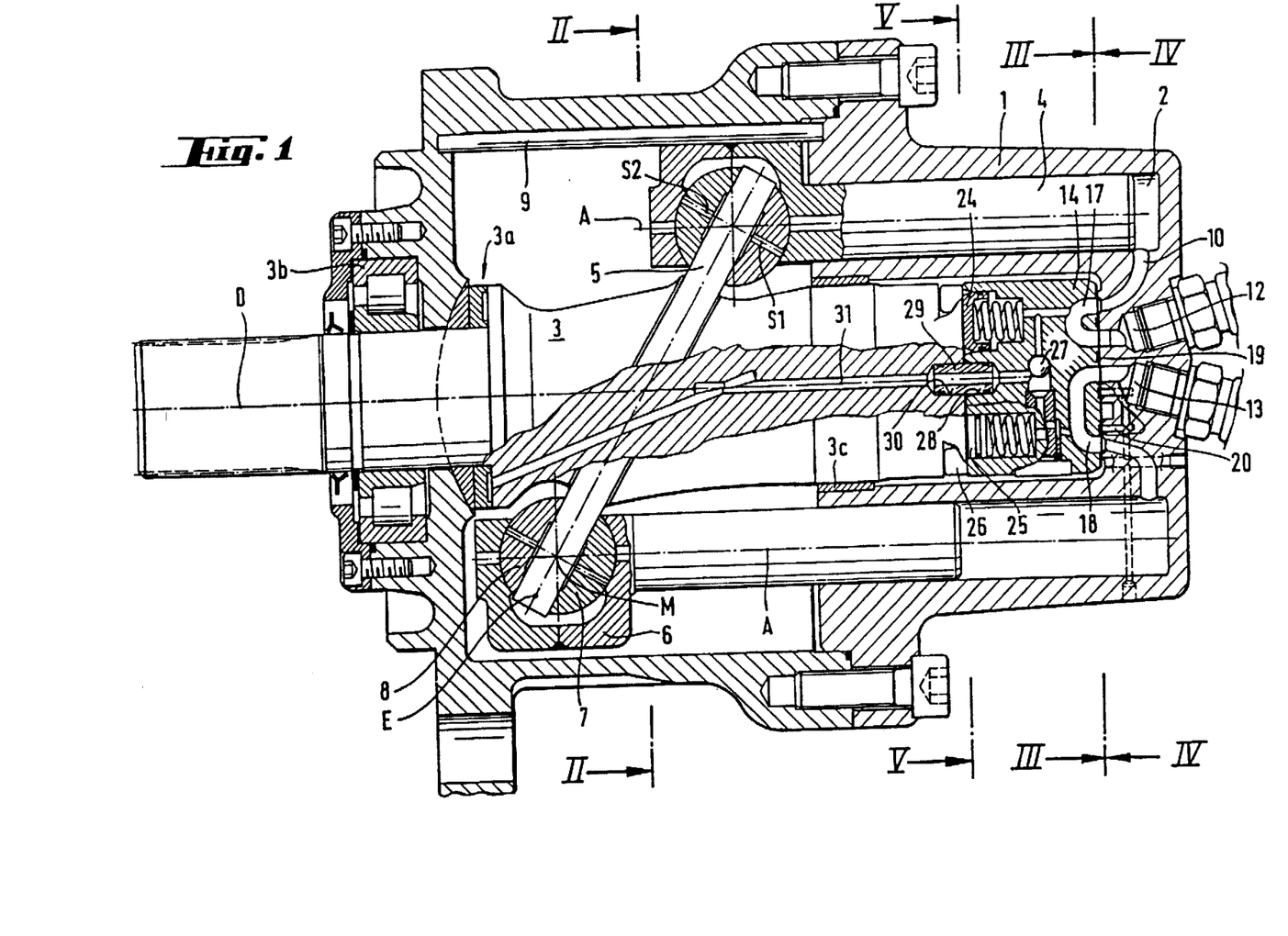
FIG. 1 is a longitudinal axial section through an axial piston machine according to one embodiment of the invention.

A support body locator 6 is connected to the end of each piston 4 outside of the cylindrical bore 2 and surrounds the outer peripheral edge of the wobble plate 5. A first support body 7 and a second support body 8 are located opposite one another partially within the support body locator 6. The first support body 7 is in engagement with the face of the wobble plate 5 adjacent to the end of the piston 4 and the second support body 8 is in engagement with the reverse face of the wobble plate 5. The support bodies 7 and 8 are segments of a common sphere and have coaxial mean perpendiculars S1 and S2. The center M of the sphere formed by the support bodies 7 and 8 is located on the center plane E of the wobble plate 5 which is located between the support bodies 7 and 8. The center M of the sphere is located on the center axis A of the piston 4.

The arrangement of the invention makes it possible to significantly increase the angle of inclination of the wobble plate compared to angles of 18° to 20° which are customary in prior art devices. For example, in the invention the angle of inclination may be increased to 30° and more. This increase in the angle of inclination results in a significant increase in the power of the hydrostatic axial piston machine because the geometric volume current is increased superproportionally when the angle of inclination of the wobble plate is increased.

At least the support body 7, which faces the piston and on which the force of the compression stroke of the piston acts, is hydrostatically supported with respect to both the support body locator 6 and the wobble plate 5 for a smooth, linear operation of the axial piston machine of the invention. On one hand, there is a smooth sliding movement of the rotating wobble plate 5 between the support bodies 7 and 8 and, on the other hand, there is a smooth rotation of the support bodies 7 and 8 in the support body locator 6. A hydrostatic bearing is not absolutely necessary on the second support body 8 because pull-back forces are active at that point. However, hydrostatic bearings are provided on both of the support bodies 7 and 8 because the support bodies have the same configuration and are interchangeable. This reduces the parts which must be maintained in inventory.

Figure 2:
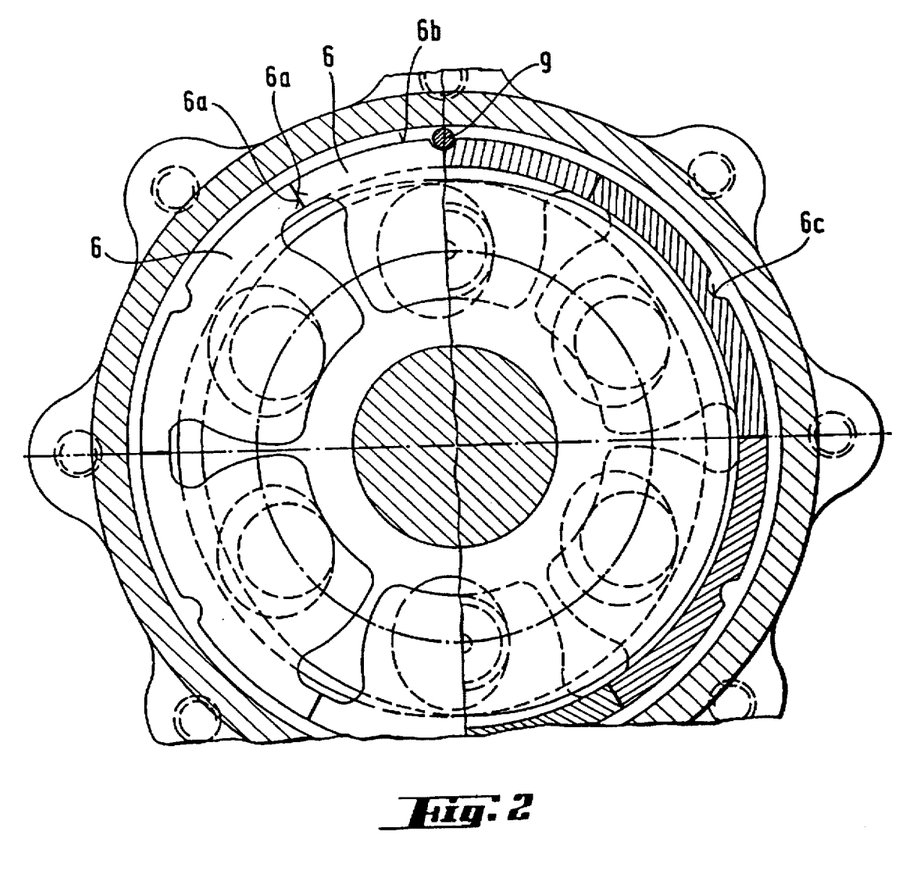
FIG. 2 is a section on line II—II of FIG. 1.

As a result of the thickness of the wobble plate 5, when the friction force is dissipated, there is a force component at the contact point of the support bodies 7 and 8 which attempts to rotate the piston 4 around its center axis. To prevent this undesirable rotation, the periphery of each support body locator is provided with radial guide surfaces 6a at the outer edge as shown in FIG. 2. The guide surfaces contact corresponding guide surfaces 6a on the support body locators 6 of the adjacent pistons 4. The periphery of the support body and the guide surfaces 6a are formed by the outer limits of a sector of a circle. At least one of the support body locators 6 is secured to the housing 1 to prevent rotation of the body locator around the corresponding center axis of the piston 4 by an axial groove 6c formed on the outer periphery 6b of the support body locator 6 which receives an elongated axial rod 9 connected to the housing 1.

Figure 3:
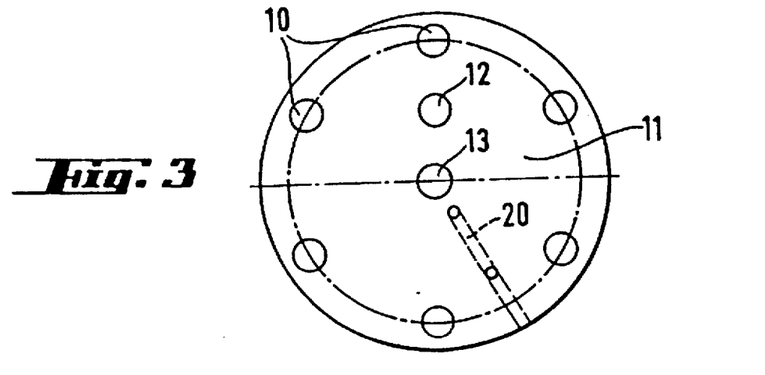
FIG. 3 is a partial section on line III—III of FIG. 1.

Each cylindrical bore 2 has a supply channel 10 which ends in an orifice surface 11 on the housing and is perpendicular to the center axis D of the shaft 3 as shown in FIG. 3 of the drawings. A first connecting channel 12 is radially offset from the supply channels 10 and a second connecting channel 13 also ends at the orifice surface 11. Depending on the direction of rotation and upon whether the machine is being used as a pump or a motor, one of the connecting channels 12 or 13 is the admission channel for a pressure medium and the other is the discharge channel for the pressure medium.

Figure 4:
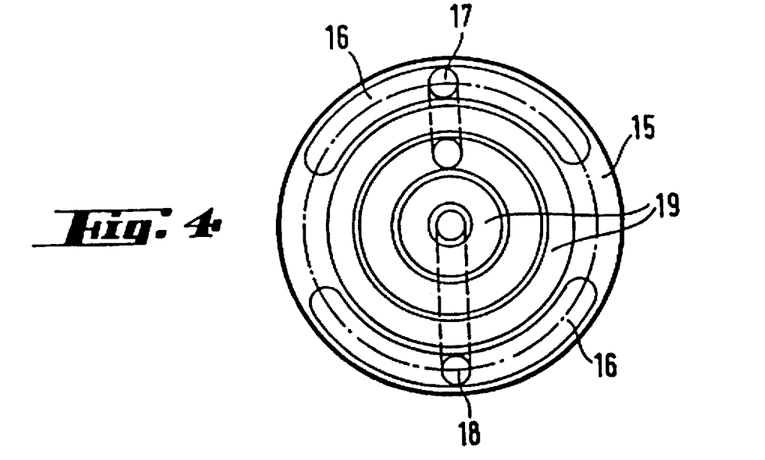
FIG. 4 is a partial section on line IV—IV of FIG. 1.

A control body 14 is located next to the orifice surface 11 in the radial space inside the axial extension of the housing 1 which has the cylindrical bores 2 formed therein. The control body 14 is connected to the shaft 3 and consequently rotates in synchronization therewith. With reference to FIG. 4 of the drawings, it will be seen that the control body 14 is cylindrical and has a control surface 15 which faces the orifice surface 11 and has two kidney-shaped control nodules 16 formed therein. The kidney-shaped control nozzles 16 are at the same radial distance from the center axis D as the supply channels 10 in the orifice surface 11 and therefore interact with the supply channels for the periodic admission and discharge of a pressure medium. Each kidney-shaped control nodule 16 is connected to a connecting channel 17 and 18 which is located in the control body 14. The connecting channels emerge at a point on the control surface 15 which faces the first connecting channel 12 or the second connecting channel 13 as shown in FIGS. 1 and 4 of the drawings.

It is also possible to provide the control surface 15 as the surface of a separate member which is connected to the housing 1. In this case, the control body 14 does not have kidney-shaped control nodules 16. It has the connecting channels 17 and 18 for the periodic connection of the control nodules 16 which are connected to the housing to the admission channel 12 or the discharge channel 13.

The control body 14 has hydrostatic relief grooves 19 which face the orifice surface 11. The grooves are pressurized with a pressure medium through connecting bores 20 which are formed in the housing and open on the orifice surface and are connected to the second connecting channel 13. The hydrostatic relief grooves may be formed in the orifice surface 11, if desired.

Figure 5:
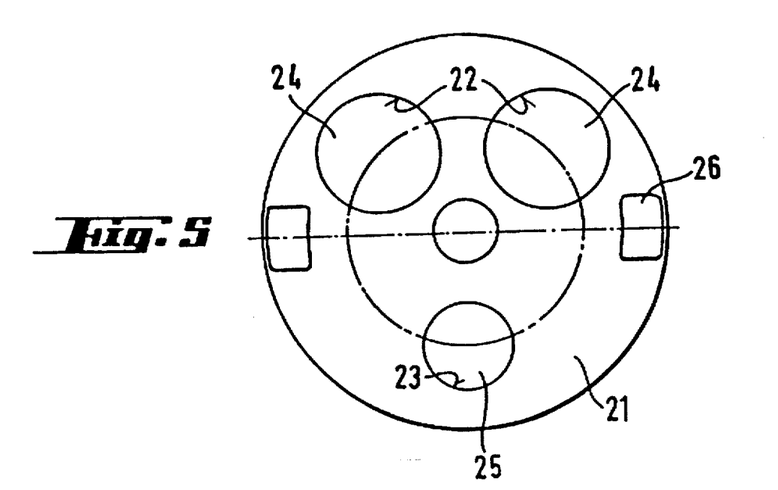
FIG. 5 is a partial section on line V—V of FIG. 1.

FIG. 5 of the drawings is a view of the end surface 21 of the control body 14 opposite the end of the shaft 3. Two large diameter bores 22 and one smaller diameter bore 23 are located in the end surface 21. A spring-loaded compensation piston 24 is located in each of the bores 22 and a spring-loaded compensation piston 25 is located in the bore 23. The compensation pistons 24 and 25 are each pushed toward the end of the shaft 3 by the force of the spring which pushes the control body 14 in the opposite direction toward the orifice surface 11 and the shaft 3 toward the hydrostatic bearing 3a of the shaft to hold it in place.

The bores 22 are connected to the connecting channel 17 and the bore 23 is connected to the connecting channel 18. The compensation pistons 24 are therefore forced toward the shaft 3 by pressure from the high pressure side of the axial piston machine, and are used to compensate for the hydrostatic relief of the control body 14 in the high pressure area of the control surface 15. The compensation piston 25 is forced toward the shaft 3 by pressure from the low pressure side of the axial piston machine, and is, thus, used to compensate for the hydrostatic relief of the control body 14 in the low pressure area of the control surface 15.

A synchronized rotational drive of the control body 14 by the shaft 3 is accomplished by the interacting connecting elements in the form of claws 26 on the end surface 21 and the matching notches in the end surface of the shaft 3.

A shuttle valve 27 is located in the control body 14 to control the respective two inputs from one of the two connecting channels 17 and 18. The shuttle valve outlet leads to an axial bore 28 which is located centrally in the end surface 21. A bushing 29 is located in the axial bore 28 and extends into the end of an aligned axial bore 30 in the machine shaft 3. A pressure medium channel 31 is connected to the axial bore 28 in the shaft 3 which leads to the hydrostatic bearing 3a and supplies the hydrostatic bearing 3a with pressure medium from the high pressure side of the axial piston machine.

Figure 6:
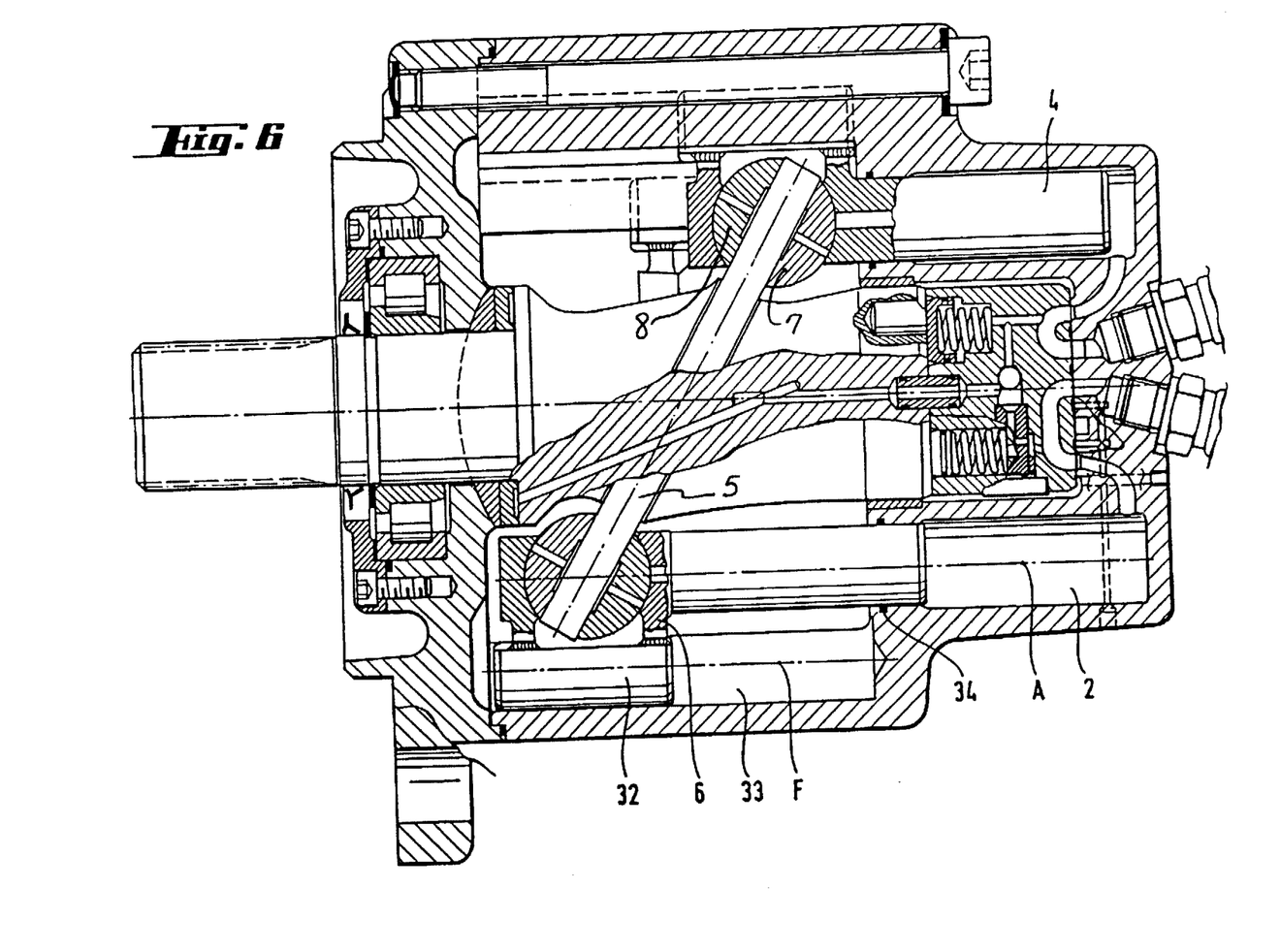
FIG. 6 is a longitudinal axial section through an axial piston machine according to a second embodiment of the invention.
Figure 7:
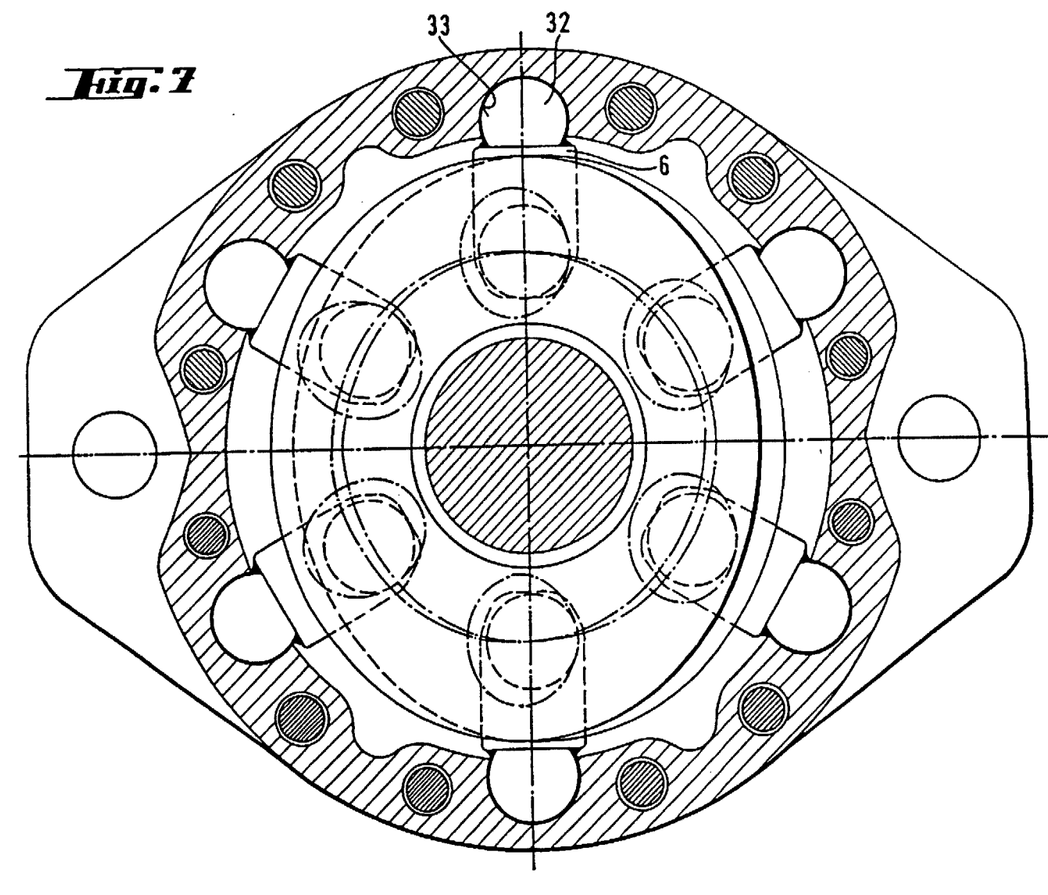
FIG. 7 is a partial section perpendicular to the axis of the axial piston machine shown in FIG. 6.

FIGS. 6 and 7 illustrate an embodiment of the axial piston machine of the invention employing the wobble plate construction. A guide device is connected to each piston 4 to absorb the transverse forces which are exerted on the piston 4. The guide device is effective over the entire length of the piston stroke and consists of a guide slide 32 connected to the support body locator 6 which is connected to an end of the piston. The guide slide 32 is a piston and moves longitudinally in a guide bore 33 which is formed in the housing. The center axis F of the guide slide 32 and of the guide bore 33 is parallel to the center axis A of the piston 4. The guide member bore 33 radially overlaps the guide slide 32 to a point beyond its centerline as shown in FIG. 7 of the drawings.

The transverse forces exerted on the piston 4 as a result of the inclination of the wobble plate 5 are supported by the arrangement shown directly at the spot where they occur. Therefore, it is possible to shorten the guide length of the pistons 4 in the cylindrical bores 2 compared to the conventional dimension which, in the prior art, is approximately 1.5–2.5 times the diameter of the piston, to an extent which is necessary to seal the cylindrical bores. Consequently, the dead stroke of the pistons 4 and thus the overall axial length of the machine can be reduced. A conical nipple in the wall of the cylindrical bore 2 makes it possible to lubricate the bore to compensate for parallelism tolerances between the piston 4. The same arrangement may be used for lubricating each guide slide 32 and the guide member bore 33. Instead of a conical nipple inserted into the cylindrical bore 2, an O-ring 34 can be inserted into a groove in the housing as shown in FIGS. 6 and 8 of the drawing figures.

Figure 8:
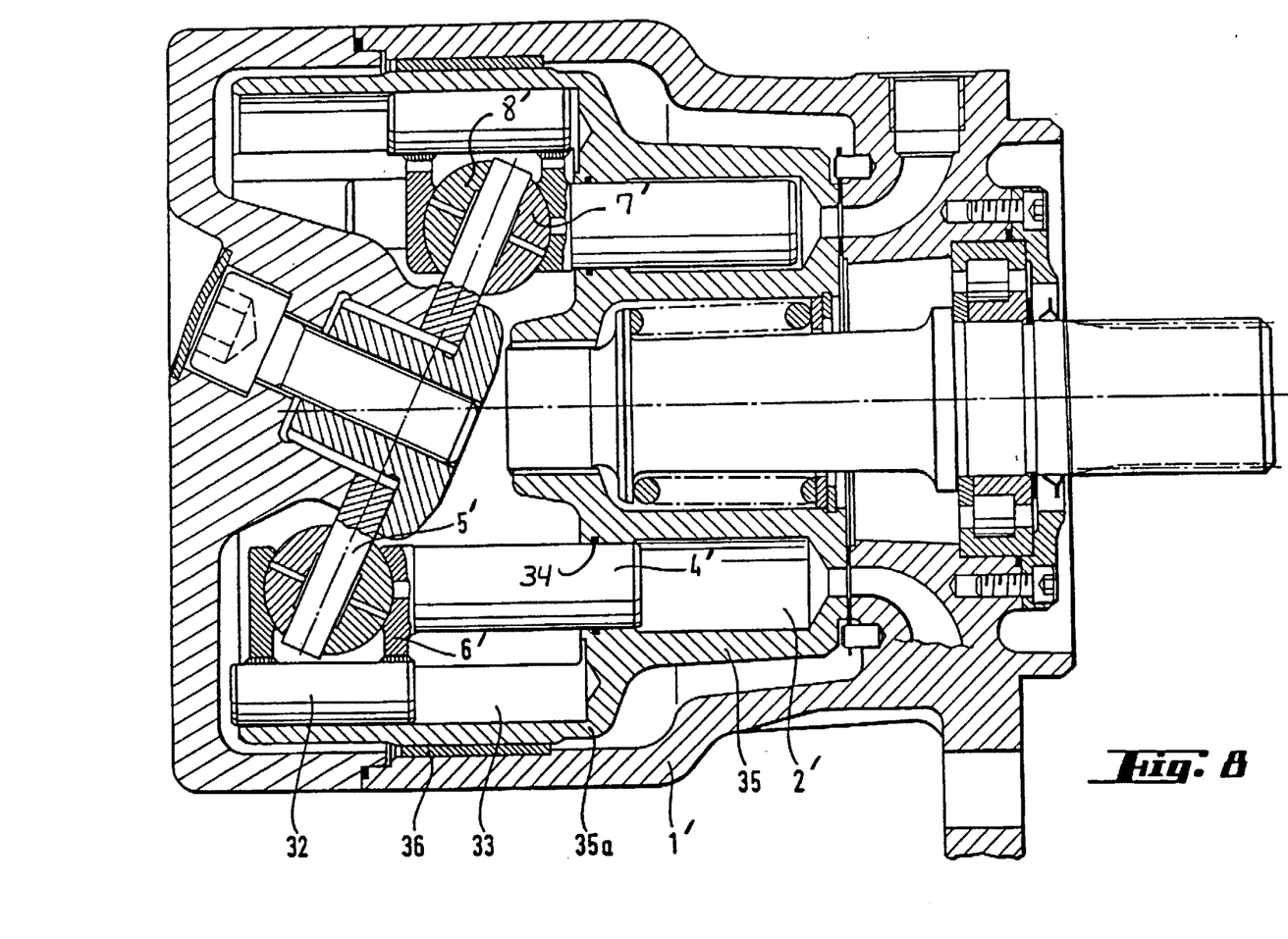
FIG. 8 is a longitudinal section through an axial piston machine according to a third embodiment of the invention.

FIGS. 8 and 9 illustrate an embodiment of the axial piston machine of the invention employing the swash plate construction. The cylindrical bores 2' are located in a rotating cylindrical drum 35, and the angle of inclination of the swash plate 5' in this embodiment is not adjustable. A guide device similar to the embodiment illustrated in FIGS. 6 and 7 of the drawings is provided on each piston 4'. The guide device is effective over the entire stroke length to absorb the transverse forces exerted on the pistons 4'. In FIGS. 8 and 9, the guide slide 32' connected to the support body locator 6' is in the form of a guide piston located in a guide bore 33 which is located in an extension portion 35a of the cylindrical drum 35. The extension portion 35a is mounted in the housing 1' by a friction bearing 36 which is extraordinarily favorable because the transverse forces and the centrifugal forces are transmitted directly to the housing 1'. The extension portion is axially adjacent to the cylindrical bore 2'.

In the embodiments of the invention illustrated in FIGS. 6 to 9, the "parallel" supports for the transverse forces exerted on the pistons simultaneously prevent the rotation of the pistons around their center axes A.

Figure 10:
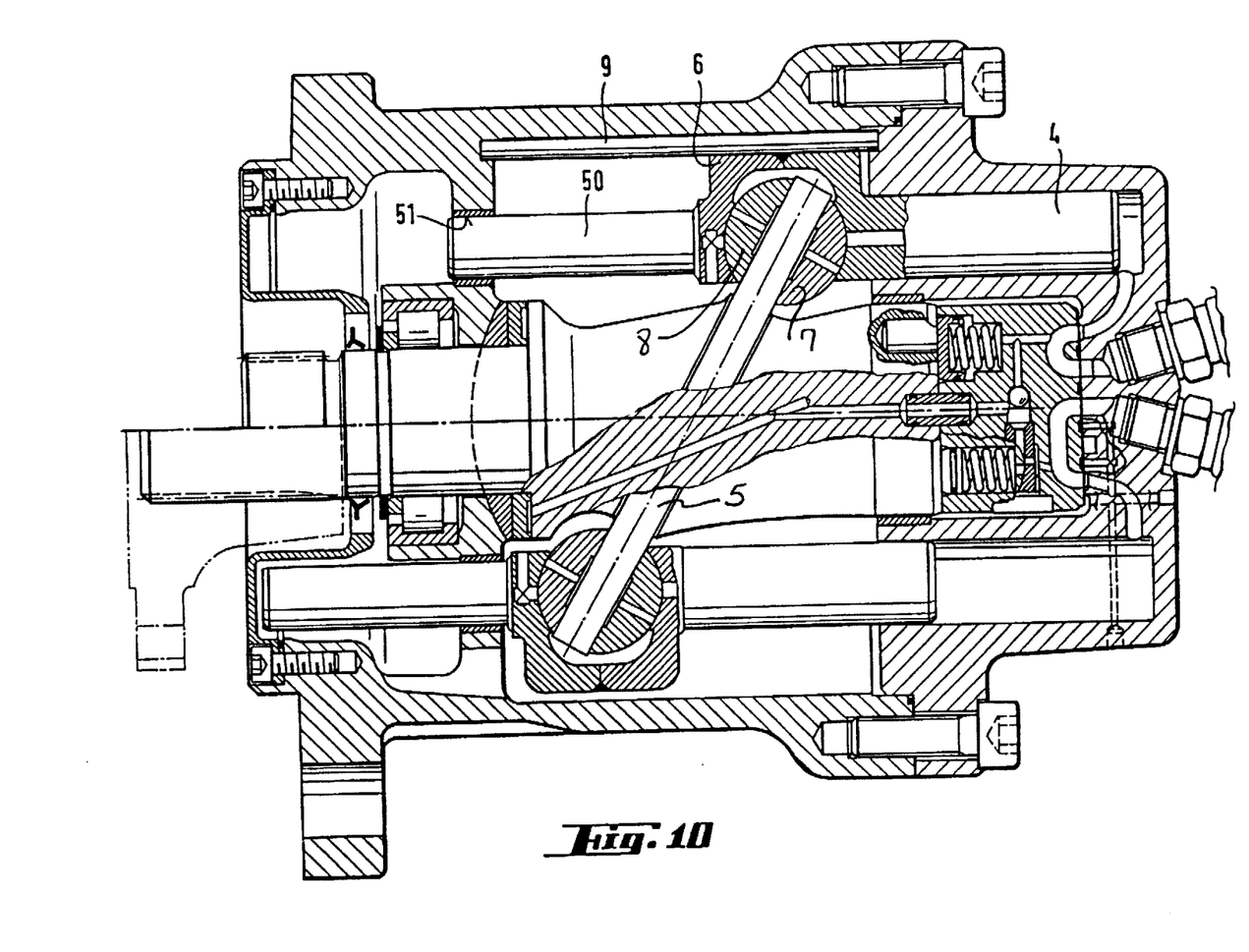
FIG. 10 is a longitudinal section through an axial piston machine according to a fourth embodiment of the invention.

FIG. 10 illustrates an embodiment of the axial piston machine of the invention which employs the wobble plate construction, wherein a second piston 50 is connected to the support body locator 6. The second piston 50 is guided in a bore 51 which is formed in the housing 1 and which is provided with a friction bearing to absorb the transverse forces which are exerted on the piston 4. The second piston 50 is connected to the support body locator 6 on the side adjacent to the second support body 8. The second piston 50 is coaxial with the first piston 4. In contrast to the parallel guidance arrangements of the piston 4 illustrated in FIGS. 6 to 9 of the drawings, the guide shown in FIG. 10 is a coaxial guide, which makes it possible to reduce the length of the segment of the piston 4 which does not extend outside of the cylindrical bore 2. In this case, all that is necessary is a sufficient extension of the piston 4 to provide a seal against the high pressure. As in the embodiment illustrated in FIGS. 1 and 2 of the drawings, guide surfaces located on the periphery of the support body and an axial rod 9 mounted on the housing prevent the rotation of the pistons 4 and 50 around their common center axis.

While the invention is described in detail herein, it will be appreciated by those skilled in the art that various modifications and alternatives to the arrangements can be developed in light of the overall teachings of the disclosure. Accordingly, the particular arrangements are illustrative only and are not limiting as to the scope of the invention which is to be given the full breadth of the appended claims and any and all equivalents thereof.

I claim:

1. An axial piston machine having a housing, an axial rotary shaft mounted in said housing, a plurality of radially spaced cylindrical bores arranged concentrically around said axial shaft, a reciprocal piston located in each of said bores and a swash plate having a peripheral edge, said swash plate located at a predetermined angle of inclination with respect to the axis of said axial shaft, each of said reciprocal pistons having means for operatively connecting an end of said piston to said swash plate, said means including a support body locator connected to said end of said piston and extending around a portion of said peripheral edge of said swash plate, and first and second support bodies in said support body locator contacting said swash plate, wherein at least said first support body has a side facing said support body locator and a side facing said swash plate and said sides of at least said first support body are hydrostatically supported on said support body locator and said swash plate, and including means for preventing rotation of each of said pistons around its center axis, wherein said means for preventing rotation of each of said pistons includes guide means on said support body locator which is effective in the peripheral direction for contacting corresponding guide means on said support body locators of adjacent pistons, elongated guide means on said housing, and means on at least one of said support body locators for cooperation with said elongated guide means on said housing to secure said at least one of said support body locators and said corresponding piston attached thereto against rotation around the center axis of said corresponding piston.

2. An axial piston machine as set forth in claim 1, wherein said first and second support bodies are spherical segments having coaxial mean perpendiculars.

3. An axial piston machine as set forth in claim 2, wherein said spherical segments are positioned to form a sphere and said sphere having a geometric center located on the center axis of said piston.

4. An axial piston machine as set forth in claim 2, wherein said spherical segments are positioned to form a sphere and said sphere having a geometric center located on the center plane of said wobble plate.

5. An axial piston machine as set forth in claim 3, wherein said spherical segments are positioned to form a sphere and said sphere has a geometric center located on the center plane of said wobble plate.

6. An axial piston machine as set forth in claim 1, wherein said first and second support bodies are segments of a common surrounding sphere.

7. An axial piston machine as set forth in claim 2, wherein said first and second support bodies are segments of a common surrounding sphere.

8. An axial piston machine as set forth in claim 3, wherein said first and second support bodies are segments of a common surrounding sphere.

9. An axial piston machine as set forth in claim 2, wherein at least said first support body has a side facing said support body locator and a side facing said swash plate and each of said sides of said support body includes a hydrostatic bearing channel and wherein said hydrostatic bearing channel in said side facing said swash plate extends substantially parallel to said swash plate.

10. An axial piston machine as set forth in claim 3, wherein at least said first support body has a side facing said support body locator and a side facing said swash plate and each of said sides of said support body includes a hydrostatic bearing channel and wherein said hydrostatic bearing channel in said side facing said swash plate extends substantially parallel to said swash plate.

11. An axial piston machine as set forth in claim 1, wherein said guide means on said support body locators which are effective in the peripheral direction to contact corresponding guide means on adjacent support body locators are edges of a sector of a circle.

12. An axial piston machine as set forth in claim 1, wherein said axial piston machine employs the swash plate principle including a cylindrical drum connected to said shaft, said plurality of radially spaced cylindrical bores located in said cylindrical drum parallel to said shaft, said pistons located in said cylindrical bores in said cylindrical drum and said swash plate operatively connected to said pistons.

13. An axial piston machine as set forth in claim 1, including a second piston connected to said support body locator opposite said connection of said support body locator to said reciprocal piston, a guide bore formed in said housing; wherein said second piston is reciprocal in said guide bore.

14. An axial piston machine as set forth in claim 13, wherein said second piston is coaxial with said reciprocal piston.

15. An axial piston machine as set forth in claim 1, wherein said axial piston machine employs the wobble plate principle including a wobble plate connected to said shaft, said plurality of radially spaced cylindrical bores located in said housing parallel to said shaft, said pistons located in said cylindrical bores in said housing and said wobble plate operatively connected to said pistons, whereby reciprocation of said pistons rotates said wobble plate to rotate said shaft.

16. An axial piston machine as set forth in claim 15, wherein said axial piston machine employs the wobble plate principle and said machine includes a plurality of radially spaced cylindrical guide bores formed in said housing coaxial with said reciprocal bores concentric with said shaft.

17. An axial piston machine having a housing, an axial rotary shaft mounted in said housing, a plurality of peripherally spaced cylindrical bores arranged concentrically around said axial shaft, a reciprocal piston located in each of said bores and a swash plate having a peripheral edge, said swash plate located at a predetermined angle of inclination with respect to the axis of said axial shaft, each of said reciprocal pistons having means for operatively connecting an end of said piston to said swash plate, said means including a support body locator connected to said end of said piston and extending around a portion of said peripheral edge of said swash plate and first and second support bodies in said support body locator contacting said swash plate, wherein at least said first support body has a side facing said support body locator and a side facing said swash plate in said sides of at least said first support body are hydrostatically supported on said support body locator and said swash plate, including a guide means for each of said support body locators effective over a full stroke length of said piston connected to said support body locator for absorbing the transverse forces of said piston generated by said swash plate, wherein said guide means is a slide formed on said support body locator for contact with a guide member wherein said slide is a guide piston and said guide member is a piston bore, whereby the center axis of said piston is parallel to the center axis of said guide piston.

18. An axial piston machine as set forth in claim 17, wherein the cross section of said piston bore extends beyond the cross section of said guide piston beyond the lateral centerline of said piston bore.

19. An axial piston machine as set forth in claim 17, including a second piston connected to said support body locator opposite said connection of said support body locator to said reciprocal piston, a guide bore formed in said housing; wherein said second piston is reciprocal in said guide bore.

20. An axial piston machine as set forth in claim 19, wherein said second piston is coaxial with said reciprocal piston.

21. An axial piston machine as set forth in claim 17, wherein said axial piston machine employs the wobble plate principal including a wobble plate connected to said shaft, said plurality of radially spaced cylindrical bores located in said housing parallel to said shaft, said pistons located in said cylindrical bores in said housing and said wobble plate operatively connected to said pistons, whereby reciprocation of said pistons rotates said wobble plate to rotate said shaft.

22. An axial piston machine as set forth in claim 21, wherein said axial piston machine employs the wobble plate principal and said machine includes a plurality of radially spaced cylindrical guide bores formed in said housing coaxial with said reciprocal bores concentric with said shaft.

23. An axial piston machine having a housing, an axial rotary shaft mounted in said housing, a plurality of radially spaced cylindrical bores arranged concentrically around said axial shaft, a reciprocal piston located in each of said bores and a swash plate having a peripheral edge, said swash plate located at a predetermined angle of inclination with respect to the axis of said axial shaft, each of said reciprocal pistons having means for operatively connecting an end of said piston to said swash plate, said means including a support body locator connected to said end of said piston and extending around a portion of said peripheral edge of said swash plate, and first and second support bodies in said support body locator contacting said swash plate, including at least a hydrostatic bearing means formed in said housing for supporting said rotary shaft in the axial direction.

24. An axial piston machine having a housing, an axial rotary shaft mounted in said housing, a plurality of radially spaced cylindrical bores arranged concentrically around said axial shaft, a reciprocal piston located in each of said bores and a swash plate having a peripheral edge, said swash plate located at a predetermined angle of inclination with respect to the axis of said axial shaft, each of said reciprocal pistons having means for operatively connecting an end of said piston to said swash plate, said means including a support body locator connected to said end of said piston and extending around a portion of said peripheral edge of said swash plate, and first and second support bodies in said support body locator contacting said swash plate, wherein said axial piston machine employs the wobble plate principle including a wobble plate connected to said shaft, said plurality of radially spaced cylindrical bores located in said housing parallel to said shaft, said pistons located in said cylindrical bores in said housing and said wobble plate operatively connected to said pistons, whereby reciprocation of said pistons rotates said wobble plate to rotate said shaft, including an orifice surface formed on said housing perpendicular to said axis of said rotary shaft, supply channels formed in said housing having ends opening on said orifice surface and an end connected to said cylindrical bores, first and second connecting channels formed in said housing having ends opening on said orifice surface and radially spaced from said ends of said supply channels, and a rotating control body located axially between the orifice surface and the axial end of said rotary shaft and channel means formed in said control body for controlling the periodic connection of said supply channels with said connecting channels.

25. An axial piston machine as set forth in claim 24, including a control surface on said rotating control body opposite said orifice surface, kidney-shaped control nodules formed at said control surface of said rotating control body, whereby said control nodules interact with said ends of said supply channels and are connected to one of said connecting channels located in said rotary control body, wherein said ends of said connecting channels located in said rotary control body open on said control surface of said rotary control body opposite to one of said ends of one of said connecting channels opening on said orifice surface of said housing.

26. An axial piston machine as set forth in claim 24, including hydrostatic relief grooves formed in said rotating control body facing said orifice surface, at least one bore in said rotary control body opening on the end of said rotating control body facing the axial end of said shaft, said at least one bore connected to at least one of said connecting channels located in said rotating control body, and a longitudinally movable compensation piston located in said at least one bore in said rotating control body, said compensation piston extending out of said at least one bore to contact the axial end of said shaft.

27. An axial piston machine as set forth in claim 26, including a spring in said at least one bore for moving said compensation piston axially toward the axial end of said shaft.

28. An axial piston machine as set forth in claim 24, having at least two compensation pistons located in said bores in said end surface of said rotating control body, one of said compensation pistons connected to the high pressure side of said control surface and one of said compensation pistons connected to the low pressure side of said control surface, whereby said bores of said compensation pistons are each connected to one of said connecting channels.

29. An axial piston machine as set forth in claim 24, wherein said rotating control body is located axially in the radial space within the axial extension of said housing having said cylindrical bores formed therein.

30. An axial piston machine as set forth in claim 28, including a shuttle valve located in said rotating control body, said shuttle valve having a pair of inputs operatively connected to said connecting channels, and an output operatively connected to said hydrostatic bearing in said housing for said shaft.

31. An axial piston machine as set forth in claim 30, including a pressure medium channel located in said shaft for connecting said hydrostatic bearing to the output of said shuttle valve and a bushing located in the end of said pressure medium channel with one end in an enlarged axial bore in an end of said shaft and the other end in an enlarged axial bore in said rotating control body.

32. An axial piston machine as set forth in claim 24, including interacting connecting means between said shaft and said end of said rotating control body for connecting said shaft and said rotating control body for synchronized rotation.

* * * * *

UNITED STATES PATENT AND TRADEMARK OFFICE
CERTIFICATE OF CORRECTION

PATENT NO. : 5,738,000
DATED : April 14, 1998
INVENTOR(S) : Franz Forster

It is certified that error appears in the above-identified patent and that said Letters Patent is hereby corrected as shown below:

Claim 21 Column 12 Line 39 "principal" should read --principle--.

Claim 22 Column 12 Line 47 "principal" should read --principle--.

Signed and Sealed this

Fourth Day of August, 1998

Attest:

BRUCE LEHMAN

Attesting Officer

Commissioner of Patents and Trademarks